United States Patent [19]

Hittler

[11] Patent Number: 4,872,252

[45] Date of Patent: Oct. 10, 1989

[54] METHOD OF REMOVING HAZARDOUS MATERIAL

[75] Inventor: Kurt D. Hittler, Atlanta, Ga.

[73] Assignee: Grayling Industries, Inc., Alpharetta, Ga.

[21] Appl. No.: 351,530

[22] Filed: May 15, 1989

Related U.S. Application Data

[62] Division of Ser. No. 278,732, Dec. 2, 1988.

[51] Int. Cl.[4] .......... B23P 19/02; B23P 6/00

[52] U.S. Cl. .......... 29/426.4; 29/402.06

[58] Field of Search .......... 29/402.11, 426.4, 402.06; 134/21, 172, 200; 312/1; 182/1

[56] References Cited

U.S. PATENT DOCUMENTS

| | | | |
|---|---|---|---|
| 4,089,571 | 5/1978 | Landy | 312/1 |
| 4,626,291 | 12/1986 | Natale | 134/21 |
| 4,812,700 | 3/1989 | Natale | 312/1 |

FOREIGN PATENT DOCUMENTS

| | | | |
|---|---|---|---|
| 1188191 | 6/1985 | Canada . | |
| WO86/05431 | 9/1986 | PCT Int'l Appl. . | |
| 1567270 | 5/1980 | United Kingdom | 312/1 |
| 2157822A | 10/1985 | United Kingdom | 312/1 |

*Primary Examiner*—Timothy V. Eley
*Assistant Examiner*—Peter Vo
*Attorney, Agent, or Firm*—Thomas & Kennedy

[57] ABSTRACT

A safety glove bag system for the removal of hazardous materials from elongated pipes or the like without danger or exposure of the operator to the hazardous material. The system utilizes a series of disposal pouches connected to a manifold which surrounds the pipe, and each of the disposal pouches may be removed from the assembly without disrupting the removal process.

5 Claims, 2 Drawing Sheets

METHOD OF REMOVING HAZARDOUS MATERIAL

REFERENCE TO RELATED APPLICATION

This is a division of co-pending application Ser. No. 278,732 filed Dec. 2, 1988.

TECHNICAL FIELD

This invention relates to the removal of asbestos or other hazardous materials, and, more particularly, to the removal of pipe insulation or lagging containing asbestos.

BACKGROUND OF THE INVENTION

Exposure to asbestos, or more particularly, to an atmosphere containing asbestos fibers or dust, creates a significant health hazard. Pipes that are covered with asbestos insulation do not, normally, create such a hazard, but if the insulation is damaged, it is essential that it be removed or repaired as soon as possible. The awareness of the dangers inherent in the presence of asbestos has led to the removal of asbestos insulation, even when undamaged. As an example, quite often a potential purchaser of a building or house will demand removal of all asbestos before consummating the purchase.

Both federal and state laws require extraordinary protection for workers engaged in the removal of asbestos containing materials, and, to afford such protection without seriously hampering the work effort, numerous devices have been used.

In U.S. paten No. 4,626,291 of Natale, there is shown one such device for removing asbestos insulation from pipes which affords a large degree of protection for the worker. The Natale device comprises a flexible, transparent bag having attached thereto and extending into the interior thereof arm holes and sleeves which are terminated in gloves for the operator. The top of the bag is sealed around the pipe, and the bag is provided with a self sealing port through which a water hose is introduced to permit spraying of the asbestos, and through which subsequently a vacuum hose is introduced to maintain a negative pressure within the bag. The device is capable only of operating on one section of pipe at a time, and must be slid along the pipe to a new length thereof to be treated as soon as the asbestos has been removed from a first length of the pipe. Practical considerations dictate the maximum length of pipe that can be treated. For example, the operator must be able to reach, through the sleeves, all portions of the pipe section under treatment. Thus, quite literally, the length of the operator's arms is a limiting factor. Where the insulated pipe to be treated is of significant length the removal operation becomes tedious and time consuming, inasmuch as only one section at a time may be treated.

When the bag is filled with debris, the bottom portion is tied off from the upper portion prior to removal of the bag from the pipe, and the vacuum hose is used to vacuum up any loose pieces of insulation remaining.

Arrangements similar to the Natale device are shown in U.K. patent No. 1,567,270 of Atkinson, and in Canadian patent No. 1,188,191 of Atkinson. These arrangements are basically the same as the Natale device, differing primarily in minor details, and are subject to the same operational limitations discussed in connection with Natale.

SUMMARY OF THE INVENTION

The present invention comprises a method and apparatus for removing asbestos insulation or the like from large lengths of pipe without the necessity of moving the apparatus along the pipe as soon as a section thereof has been completed. Additionally, the apparatus is capable of being operated by a plurality of workers simultaneously, thereby materially decreasing the length of time necessary to strip an entire pipe of its insulation.

The invention, in a preferred embodiment thereof, comprises an elongated tubular sleeve or manifold for loose mounting around the pipe, and a plurality of debris collection pouches depending from the sleeve or manifold and joined thereto by neck portions. Each portion of the manifold from which a pouch depends is joined to the adjacent portion by an annular sleeve or neck. Means are provided for tieing the extreme ends of the manifold securely to the pipe, and further means are provided for supporting the annular sleeves loosely about the pipe.

In operation, the manifold is placed about the pipe and sealed, and its extreme ends are tied securely to the pipe. The support means for the annular sleeves are placed thereabout to permit communication between adjacent portions of the manifold while supporting the annular sleeves. The insulation is then stripped from the pipe by suitable means, such as the operator spraying with water or other liquid, and then chiseling, cutting, or prying loose, and the stripped material falls into and thus is collected by the pouch or pouches, depending upon how many operators are active.

When a pouch is full, or its associated section of pipe is clean, it is tied off at the neck portion, the support means for the annular sleeve is tightened to seal the annular sleeves to the pipe, and the pouch is then removed by cutting either at the tied sleeves, or above the tied neck portion. In this manner, dust and debris are never exposed to the ambient air, either from the pouch being removed, or from adjacent pouches.

The arrangement of the invention can be operated by one person, going from pouch area to pouch area, or by several operators simultaneously, without the necessity of moving the apparatus along the pipe length, except in cases of extremely long pipes.

BRIEF DESCRIPTION OF THE DRAWING

The various features and advantages of the present invention will be more clearly seen and understood from the following detailed description, read in conjunction with the accompanying drawings, in which.

DETAILED DESCRIPTION

Figure 2:
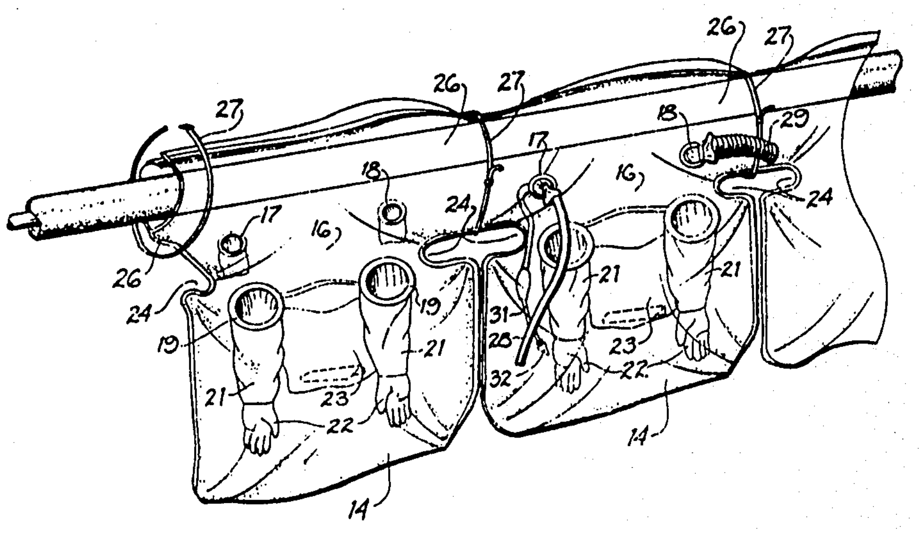
FIG. 2 is a perspective view of two of the debris collecting pouches shown in greater detail than in FIG. 1.

The safety glove bag of the present invention, as illustrated in FIG. 2, comprises an elongated tubular sleeve or manifold 11, preferably airtight, having a longitudinally extending opening 12 in the top thereof and designed and dimensioned to fit loosely around a pipe from which insulation or lagging is to be removed. A suitable closing and sealing means 13, which may be an adhesive tape or the like, extends along sleeve 11 at the opening 12 , and is used to seal opening 12 sheet after the sleeve has been mounted on the pipe.

Depending from manifold 11 is a plurality of debris collection pouches 14,14 each one of which is joined to sleeve 11 by a necked down portion 16. Located in sleeve 11 above each necked down portion 16 are first and second self-sealing openings 17 and 18, which afford air tight connections from the exterior of the assembly to the interior of each of the bags 14 for a water hose and a vacuum hose, as will be discussed more fully in connection with FIG. 2.

Each of the pouches 14 has a pair of openings 19 to which are attached, interiorly of the pouch, a pair of sleeves 21, which terminate in gloves 22. Located between each pair of sleeves 21, on the interior of the pouch 14, is a tool bag 23 which is designed to contain the necessary tools for the insulation removal, and which is accessible by the operator from the interior of the pouch 14 by means of sleeves 21 and gloves 22, into which the operator thrusts his arms. The structure as thus far described prevents any communication of the interior of the safety glove bag with the exterior or ambient atmosphere, while enabling an operator to operate on the asbestos on the pipe through sleeves 21 and gloves 22 without exposure to the asbestos.

Figure 1:
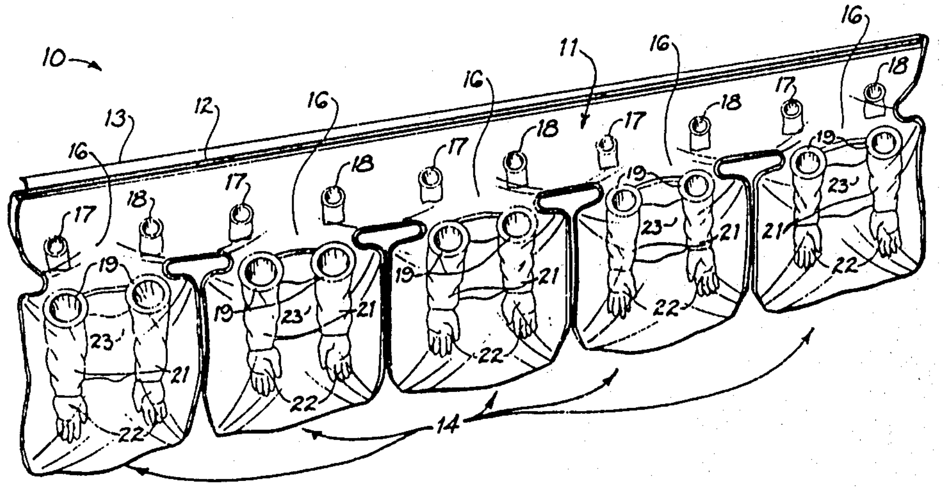
FIG. 1 is a perspective view of a preferred embodiment of the present invention.

In FIG. 2 are shown two of the pouches 14 of FIG. 1 in greater detail, and depicting separate steps in the operation of the invention. As can be seen in FIG. 2 indentations 24, 24 form the necked down portions 16, 16 which join pouches 14 to sleeve or manifold 11. Indentations 24 also form a plurality of annular portions 26 in sleeve 11. Annular portions or sleeves 26 are supported loosely by suitable tieing means 27. Where the annular sleeve 26 is on the extreme end of the assembly, tieing means 27 is used to tie the portion 26 securely to the pipe being treated, as best seen in FIG. 3.

Once the manifold of sleeve 11 is in place along with the associated support means 27, a water hose 28, and a vacuum hose 29 connected to a HEPA filtration system, not shown, are connected to self sealing connections 17 and 18 such that there is no leakage from the interior of pouches 14 to the exterior. A continuation 31 of hose 28 is attached to connection 17 on the interior of the pouch 14 and terminates in a nozzle 32.

Figure 3:
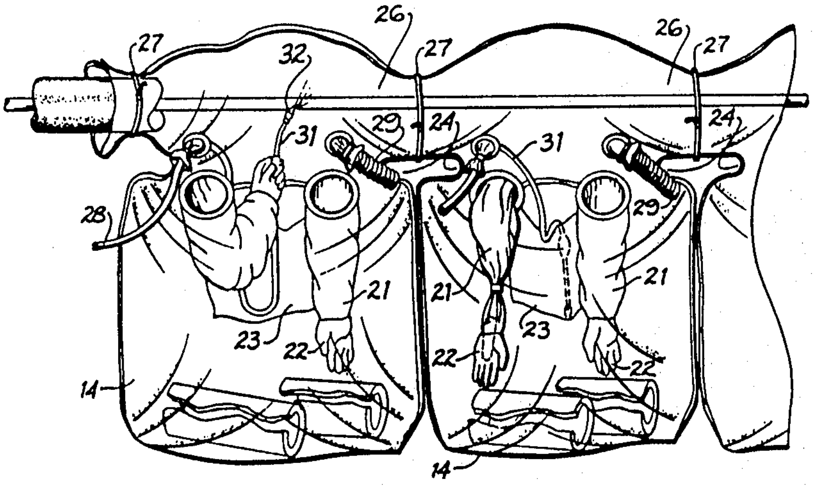
FIG. 3 is a perspective view of the pouches of FIG. 2, illustrating different states in the operation of the invention.

In FIG. 3, the left hand pouch 14 is shown as being located at the one extreme end of manifold 11, and, as a consequence left hand support member 27 tightly binds its corresponding annular sleeve 26 to the pipe, as shown. FIG. 3 depicts further the step of spraying the insulation on the pipe with water through hose 28 and 31 and nozzle 32. At the same time, a negative pressure is created within the manifold and pouch interior by vacuum hose 29 so that if any leaks exist, the direction of leakage will be to the interior, and not to the exterior. The right hand pouch 14 in FIG. 3 depicts the conclusion of the insulation removal. After spraying, hose 31 and nozzle 32 are placed in tool bag 23, and hose 28 may then be disconnected. In addition, the sleeves 21 may be inverted and knotted, as shown in FIG. 3. Then sleeve 21 is inverted, i.e., pulled out, the interior of the sleeve becomes the exterior, and vice versa, hence that surface of the sleeve which was exposed to the asbestos is the interior and hence is not exposed to the ambient air.

Figure 4:
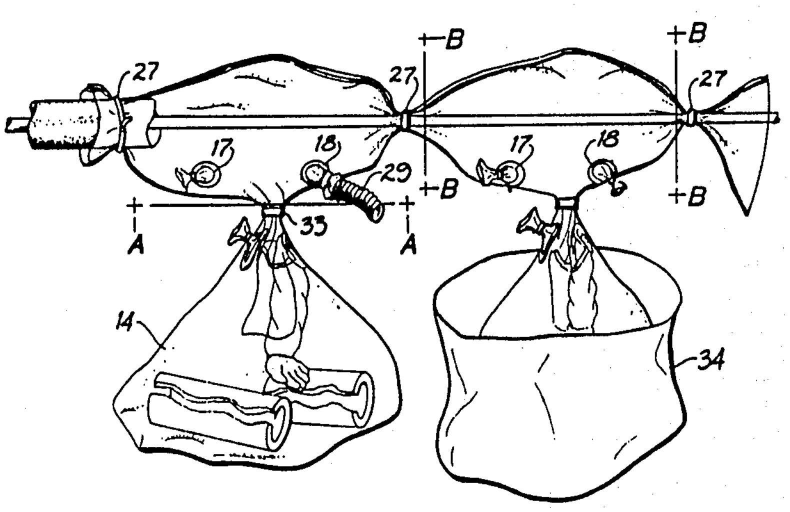
FIG. 4 is a perspective view of the pouches of FIG. 2 after they have been readied for disposal.

The final steps in the process of the present invention are shown in FIG. 4. Left hand pouch 14 is shown tied tight by means 33. In order that the pouch 14 may be completely sealed off, it is first twisted at the necked down portion 66, and then tieing means 33 is knotted about the twisted portion, as shown. The annular sleeves 26 are likewise tied securely to the pipe by means 27, as shown, and then the pouch 14 is placed in a receptacle 34, and with the HEPA filtration system still activated the pouch is separated from manifold 11 by cutting along lines B—B, B—B, or along line A—A. Receptacle 34 may then be sealed, as by tieing, not shown, and disposed of.

The foregoing description has illustrated a preferred embodiment of the invention and a preferred method of using or operating it. Numerous changes or modifications may occur to workers in the art without departure from the spirit and scope of the invention as set forth in the following claims.

I claim:

1. A method of removing hazardous material from an elongated pipe comprising the steps of:
   (a) mounting to the pipe a bag of the type that has a series of debris collection pouches joined to a manifold at a series of necks and with the bag being mounted with the manifold secured about the pipe and the pouches depending downwardly therefrom with internal communication established between the pouches and manifold;
   (b) stripping material from the pipe whereupon the stripped material falls as debris into at least one of the pouches;
   (c) isolating the one pouch from the manifold by twisting and tieing off the neck that joins the one pouch with the manifold; and
   (d) severing the pouch from the manifold whereby the isolated one pouch containing debris is separated from the manifold without interruption in internal communication of the manifold with the remaining pouches and without exposure of its debris to ambient air.

2. A method of removing hazardous material from an elongated pipe as claimed in claim 1, and further comprising the steps of:
   (a) securing at least one of the annular portions of the manifold located adjacent to the one pouch snugly to the pipe; and
   (b) severing the one annular portion of the manifold.

3. The method of claim 2 wherein step (a) a band is tied loosely about the annular portions of the manifold and pipe to provide bag support.

4. The method of claim 3 wherein step (d) the band is drawn tightly about the long neck portion and pipe.

5. A method of removing hazardous material from an elongated pipe as claimed in claim 1, and further comprising the step of severing the pouch from the manifold above the tied neck portion.

* * * * *